United States Patent
Hoffenberg

(10) Patent No.: US 10,572,592 B2
(45) Date of Patent: Feb. 25, 2020

(54) METHOD, DEVICE, AND COMPUTER PROGRAM FOR PROVIDING A DEFINITION OR A TRANSLATION OF A WORD BELONGING TO A SENTENCE AS A FUNCTION OF NEIGHBOURING WORDS AND OF DATABASES

(71) Applicant: Theo Hoffenberg, Paris (FR)

(72) Inventor: Theo Hoffenberg, Paris (FR)

( * ) Notice: Subject to any disclaimer, the term of this patent is extended or adjusted under 35 U.S.C. 154(b) by 0 days.

(21) Appl. No.: 15/422,525

(22) Filed: Feb. 2, 2017

(65) Prior Publication Data

US 2017/0220557 A1    Aug. 3, 2017

(30) Foreign Application Priority Data

Feb. 2, 2016 (EP) .................................. 16305116

(51) Int. Cl.
*G06F 17/27* (2006.01)
*G06F 16/33* (2019.01)
*G06F 17/28* (2006.01)

(52) U.S. Cl.
CPC ...... *G06F 17/2785* (2013.01); *G06F 16/3344* (2019.01); *G06F 17/271* (2013.01); *G06F 17/2735* (2013.01); *G06F 17/289* (2013.01)

(58) Field of Classification Search
CPC ..... G06F 17/28; G06F 17/289; G06F 17/2785
USPC ........................................................ 704/2–9
See application file for complete search history.

(56) References Cited

U.S. PATENT DOCUMENTS

| | | | |
|---|---|---|---|
| 4,507,750 A * | 3/1985 | Frantz | G06F 17/28 704/251 |
| 6,687,689 B1 | 2/2004 | Fung et al. | |
| 7,058,652 B2 * | 6/2006 | Czarnecki | G06F 16/951 |
| 8,027,989 B1 * | 9/2011 | Bruecken | G06F 16/748 707/758 |
| 8,892,423 B1 * | 11/2014 | Danielyan | G06F 17/2785 704/10 |
| 9,436,681 B1 * | 9/2016 | Tunstall-Pedoe | G06F 17/289 |
| 2001/0029455 A1 | 10/2001 | Chin et al. | |
| 2004/0002849 A1 * | 1/2004 | Zhou | G06F 17/27 704/4 |
| 2011/0093256 A1 * | 4/2011 | Williams | G06F 17/2785 704/9 |

(Continued)

FOREIGN PATENT DOCUMENTS

WO     02/056196 A2     7/2002

OTHER PUBLICATIONS

EP Search Report, dated Jul. 11, 2016, from corresponding EP application.

*Primary Examiner* — Shaun Roberts
(74) *Attorney, Agent, or Firm* — Young & Thompson

(57) ABSTRACT

Disclosed is a method for providing at least one word linguistically associated with at least one searched word belonging to a set of words. After having queried (325) a first database of expressions to obtain a set of expressions including the at least one searched word and obtaining the set of expressions, a second database is queried (340), for each expression of at least an expression subset of the obtained set of expressions, to obtain at least one word linguistically associated with the at least one searched word and obtaining the at least one word linguistically associated with the at least one searched word. Next, at least one obtained word linguistically associated with the at least one searched word is selected (350).

17 Claims, 4 Drawing Sheets

(56) References Cited

U.S. PATENT DOCUMENTS

2012/0123765 A1* 5/2012 Estelle .................. G06F 17/277
704/3
2012/0310915 A1 12/2012 Yang
2015/0331855 A1* 11/2015 Rylov ..................... G06F 17/28
704/2

* cited by examiner

METHOD, DEVICE, AND COMPUTER PROGRAM FOR PROVIDING A DEFINITION OR A TRANSLATION OF A WORD BELONGING TO A SENTENCE AS A FUNCTION OF NEIGHBOURING WORDS AND OF DATABASES

FIELD OF THE INVENTION

The present invention relates generally to computerized translation of words, and more specifically to a method, a device, and a computer program for providing a definition or a translation of a word belonging to a sentence as a function of neighbouring words and of databases.

BACKGROUND OF THE INVENTION

When reading a text, in particular in a foreign language, one often encounters unknown words or expressions. In such a situation, a traditional approach consists in looking up each of the unknown words or expressions in a dictionary to obtain a translation or a definition thereof.

Such an approach has limitations since many words have several meanings. Accordingly, when looking up a word or an expression in a dictionary, several translations or definitions are provided and it is necessary to choose the right one.

For the sake of illustration, the English word "please" can have different meanings: the definition of this word in the expression "Please, could you help me?" is not the same as in the expression "Do as you please".

Similarly, it may be difficult for someone to form groups of words linguistically linked in sentences, to improve understanding of the sentence, that is to say to detect when a word is part of a larger group of words, giving it a specific meaning.

It is difficult to describe precisely the ability humans have to group words together and chunk sentences in cohesive segments, even when those segments are not "continuous".

For example, the word "belong" bears different meanings in the expressions "I belong to you" and "I belong there" because of the groups they belong to. Likewise, for the same reason, the verb "to rip" has different meanings in the expressions "He ripped his clothes" and "He ripped everybody off", notably because of the phrasal verb "rip off" in which another word can be inserted.

Therefore, there is a need for an improved system providing accurate translations or precise definitions of words as well as examples of use of these words.

SUMMARY OF THE INVENTION

It is a broad object of the invention to remedy the shortcomings of the prior art as described here above.

It is a first object of the present invention to provide a method for a computer for providing at least one word linguistically associated with at least one searched word belonging to a set of words, the method comprising:
 querying a first database of expressions to obtain a set of expressions comprising the at least one searched word and obtaining the set of expressions;
 for each expression of at least an expression subset of the obtained set of expressions, querying a second database to obtain at least one word linguistically associated with the at least one searched word and obtaining the at least one word linguistically associated with the at least one searched word; and
 selecting at least one obtained word linguistically associated with the at least one searched word.

Accordingly, the method of the invention makes it possible to provide relevant results with a response time that is low enough to offer satisfactory user-friendliness.

In an embodiment, the method further comprises a step of selecting expressions of the obtained set of expressions, the expression subset comprising the selected expressions.

In an embodiment, the selection is based at least partially on a criterion representing a matching level of a considered expression in relation to several contiguous or non-contiguous words of the set of words comprising the at least one searched word.

In an embodiment, the selection is based at least partially on an indication associated with an obtained word linguistically associated with the at least one searched word.

In an embodiment, the method further comprises a step of ordering the at least one selected obtained word linguistically associated with the at least one searched word to increase user-friendliness.

In an embodiment, the method further comprises a step of normalizing the set of words according to one or more predetermined criteria.

In an embodiment, the method further comprises a step of processing the at least one searched word to obtain at least one word linguistically associated with the at least one searched word while considering the at least one searched word alone.

In an embodiment, the method further comprises a step of generating a set of candidate expressions, each candidate expression comprising the at least one searched word, and, for each of the candidate expressions, querying the second database to obtain at least one word linguistically associated with the at least one searched word and obtaining the at least one word linguistically associated with the at least one searched word.

In an embodiment, the method further comprises a step of filtering the set of candidate expressions before querying the second database for each of the candidate expressions.

In an embodiment, the method further comprises a step of filtering the set of candidate expressions after querying the second database for each of the candidate expressions.

In an embodiment, the first database of expressions and the second database of expressions are the same.

In an embodiment, the method further comprises a step of selecting the at least one searched word from the set of words and a step of displaying at least one selected obtained word linguistically associated with the at least one searched word.

Since the present invention can be implemented in software, the present invention can be embodied as computer readable code for provision to a programmable apparatus on any suitable carrier medium, and in particular a suitable tangible carrier medium or suitable transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. It is intended that any additional advantages be incorporated herein.

DETAILED DESCRIPTION OF EMBODIMENTS OF THE INVENTION

According to a general embodiment of the invention, the method of the invention uses large monolingual or multilingual corpora and big data algorithms and comprises the steps of:

obtaining a sentence and the position in the sentence of one or more words to be searched;

analysing the searched words in the context of the sentence, using comparison to existing corpora together with linguistic algorithms, punctuation, casing, morphological reduction, compounds identification, etc.; and providing as a result a set of relevant words or expressions, sorted by relevance, advantageously together with definitions, translations, and/or real-life examples. The result may also include a priority indication as to which words or expressions to display in priority.

For example, after having obtained the sentence "We should grab a cup of coffee one of these days" together with the word "one", the method of the invention may return translations and examples for the expressions "one" and "one of these days", indicating the latter as the one to be preferably displayed.

Though the most direct application of the method of the invention is in the context of a user reading a text in a foreign language, it can also be used in a monolingual context. In this case, the system will detect relevant words or expressions, and provide definitions together with real-life examples.

Figure 1:
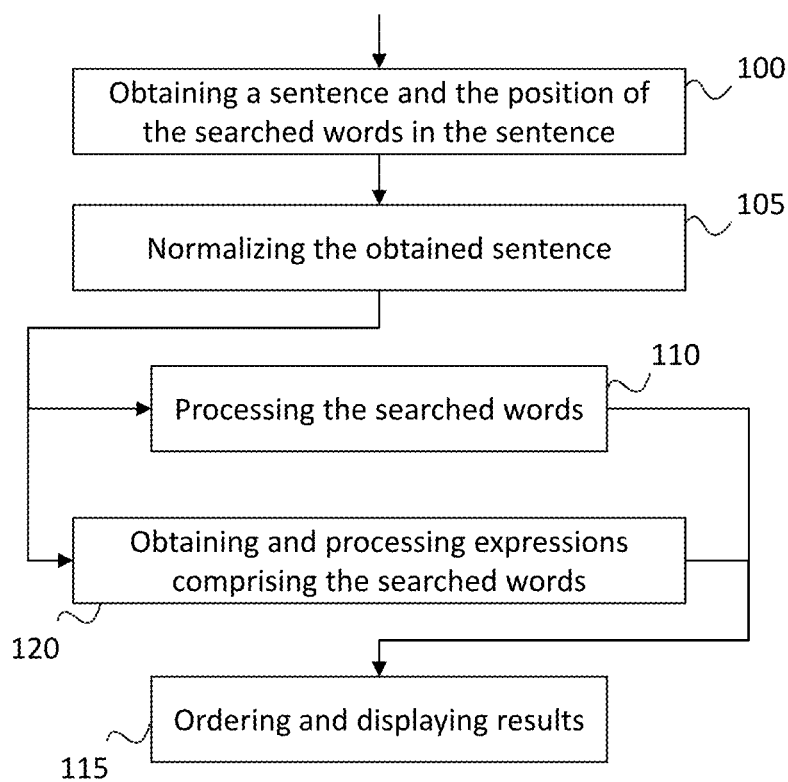
FIG. 1 illustrates steps of an algorithm for providing efficiently relevant translations or definitions of words.

FIG. 1 illustrates steps of an algorithm for providing efficiently relevant translations or definitions of words.

As illustrated, a first step is directed to obtaining a sentence and the position in the sentence of the word(s) to be searched (step 100).

Next, the obtained sentence is normalized (step 105).

Such a step may comprise a first step for replacing characters from a standard-character alternative list (as defined herein below) by their standard counterparts. It may also comprise a step of removing carriage return characters and a step of joining words that have been split between lines with dash characters. Finally, double space characters are preferably replaced by single space characters.

In a next step, the words to be searched are processed according to a standard algorithm (step 110) to provide a first translation or definition of the words. Basically, such a step may comprise sending a query including the searched words to a local or remote dictionary and receiving the corresponding translations or definitions. It is very fast. It typically takes less than half a second.

According to a particular embodiment, step 110 corresponds to the algorithm described with reference to FIG. 2.

Results are preferably immediately displayed after being obtained (step 115).

In parallel to the step of processing the searched words, expressions comprising the searched word are obtained and processed to provide second translations or definitions of the word according to the obtained expressions (step 120). Such a step typically takes about one to five seconds.

According to a particular embodiment, step 120 corresponds to at least one of the algorithms described with reference to FIGS. 3 and 4.

The results obtained from steps 110 and 120 are then combined and ordered to be displayed in such a way that the more relevant results are displayed first (step 115).

For the sake of clarity, here are some definitions of words used throughout the present description:

"word": a string of characters surrounded by separator characters (from the "word separator list");

"expressions": a group of words; and

"source language" and "target language": the language that the input sentence is written into and the language in which the user is seeking to get a translation, a definition, and/or examples, respectively.

Still for the sake of clarity, several lists are predefined. They depend on the languages (i.e. there exists a different version of the lists for each language that can be used):

"word separator list": a list of characters typically used in the considered language to separate words, for example {" " (space), ",", ".",";"} excluding apostrophe;

"connector list": a list of words typically used in the considered language to connect words or propositions, for example {"and", "or", "but"};

"article list": a list of grammatical articles for the considered language, for example {"a", "an", "the"};

"elided article list": a list of grammatical articles, for the considered language, in their elided form, for example {"l' "} in French (as in "l'ami");

"function word list": a list of "tool-words" such as words that have little lexical meaning in the language and are used mainly to express grammatical relationships with other words within a sentence (e.g. articles, pronouns, conjunctions, and particles), for example {"the", "him", "if", "then", "will"};

"segment separators list": a list of characters that are typically used in the considered language to separate sentence segments, for example all characters excluding letters, figures, spaces, non-breaking spaces, apostrophes, and hyphens;

"punctuation character list": a list of punctuation signs in the considered language, for example {".", ",", "?", "!", " ... "};

"standard-character alternative list": a list of unicode characters that are used as alternatives to other, more standard characters in the considered language, together with the corresponding standard character, for example {U+00AD, U+2011, U+2043} (soft hyphen, non-breaking hyphen, hyphen bullet, all to be replaced by a standard hyphen);

"suffix list": a list of elements that can be found as suffixes to words in the considered language. This list may include, for example, the "'s" used to signal the use of genitive.

It is to be noted that in the field of linguistics, "phrasemes" designate expressions that have a certain level of lexical stability, or fixedness in a given language. Expressions typically qualify as lexical units when their meaning as a whole differs from the sum of the meanings of their parts, or when they appear in the language with a frequency that is statistically significant.

According to embodiments of the invention, a "phraseological index" is used to indicate the level of lexical stability of any given expression in a given language. For an expression A to have a higher phraseological index than an expression B in a given language means that expression A is more likely to be a phraseme in this language.

Though the description of how the phraseological index is computed is beyond the scope of this document, it is typically derived from the combination of multiple criteria such as the expression's length, its frequency, whether or not it corresponds to a dictionary entry, whether its translation is different from its word to word translation in any given language, whether or not it ends with a connector, and so on.

It is also to be noted that for the sake of the description a "corpus processing server" designates a web server equipped with corpus processing software and loaded with monolingual and/or multilingual corpora and dictionaries. The server may have an API (Application Protocol Interface), through which it can receive external requests, execute the required corpus processing tasks, and return results.

According to particular embodiments, the corpus processing server (CPS) provides the following standard functions:

identification of relevant expressions, also referred to as "suggestions": given a selected word or selected words, a language and a number N, this function returns a list of N relevant expressions (in the considered) language that contain the selected words, together with their phraseological index. The returned expressions are obtained from a text database;

identification of aligned examples for the expression: given an expression and a language pair, this function returns a set of aligned examples that are taken out of a bilingual corpus corresponding to the input language pair. When enough examples are available to infer translations for the expression, examples are grouped by their corresponding translation. When available, information on the part-of-speech of the translation may be provided. Additional meta-information such as the expression's phraseological index and whether or not the expression corresponds to a dictionary entry may also be returned;

identification of a definition: given a word or an expression and a language, this function returns one or more definitions (if any) for the word or expression.

Figure 2:
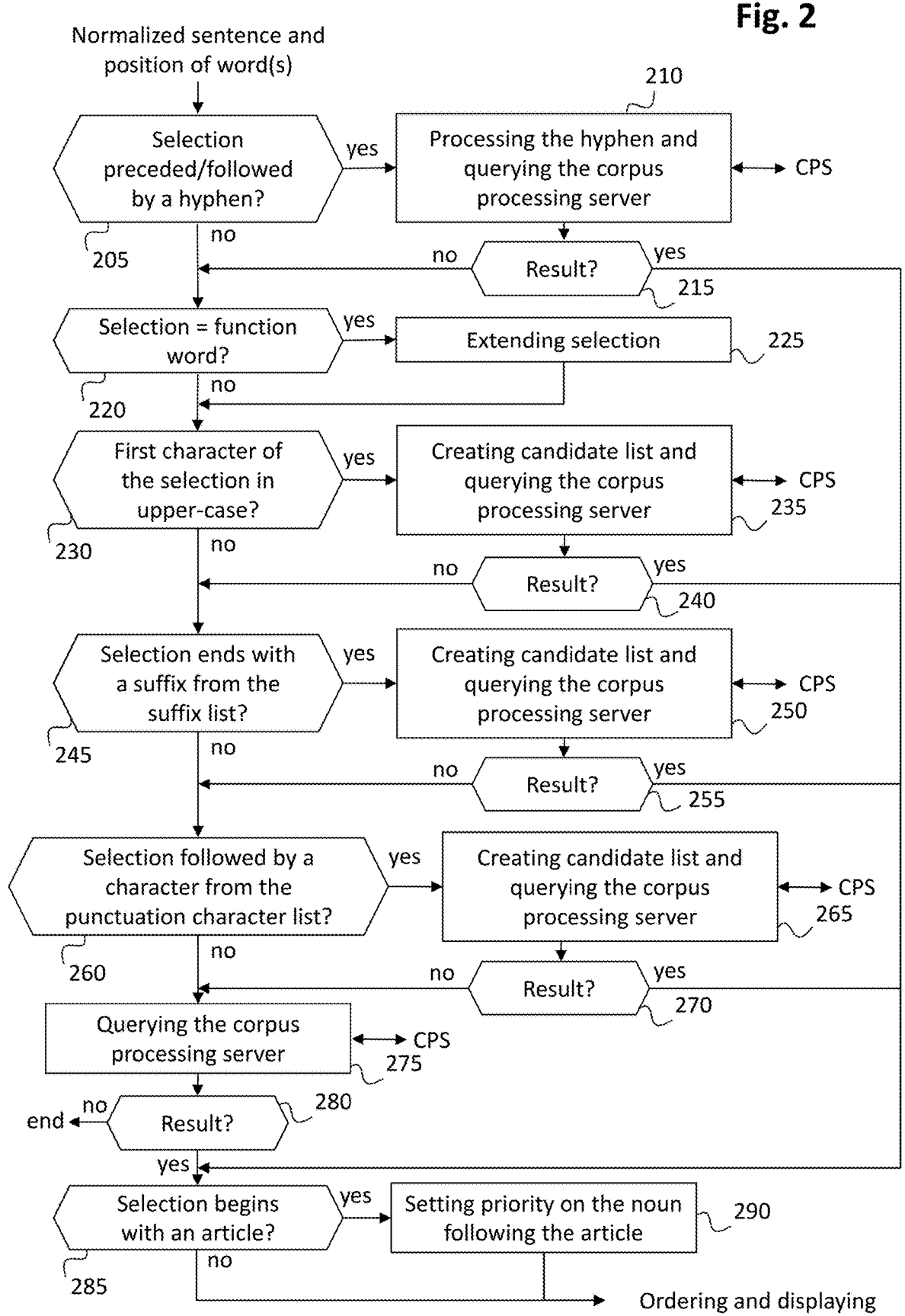
FIG. 2 illustrates steps of an example of an algorithm for processing a set of one or more searched words alone, as illustrated with reference 110 in FIG. 1.

FIG. 2 illustrates steps of an example of an algorithm for processing a set of one or more words alone, as illustrated with reference 110 in FIG. 1.

According to the algorithm illustrated in FIG. 2, several mechanisms are used to take into account special cases such as a searched word preceded or followed by a hyphen, a selected word preceded by a word belonging to the articles list, and a searched word followed by a punctuation mark. Depending on the situation, all these mechanisms may be applied sequentially or some of them may be skipped in order to optimize performance, as described below.

According to this algorithm, a selection is updated as a function of words to be searched and of the characters preceding and following these (or this) words. A list of candidates is created from this selection to query a corpus processing server (CPS).

At the beginning of the algorithm described in FIG. 2, the selection corresponds to the words selected from the normalized sentence according to the obtained position of the word(s) to be searched.

As illustrated, a first step comprises a test that is carried out to determine whether or not a hyphen immediately precedes or follows the searched words (step 205). If a hyphen immediately precedes or follows the searched words, the hyphen is processed (step 210).

For the sake of illustration, processing the hyphen may comprise a step of updating the selection and a step of creating candidates.

The selection may be updated so that it comprises the searched words, the hyphen, and the word immediately preceding or following the searched words (depending whether the hyphen precedes or follows the searched words):

(updated) selection=preceding word+hyphen+selection or (updated) selection=selection+hyphen+following word The created candidates typically comprises the updated selection as well as the selection wherein the hyphen has been deleted and wherein the hyphen has been replaced by a space character:

candidates={selection, selection with hyphen replaced by a space character, selection with hyphen deleted}

Then, for each of the candidates, the corpus processing server is queried to obtain a translation, a definition, and/or examples directed to the corresponding candidate.

If the corpus processing server returns at least one result in response to the candidate queries (step 215), the obtained results are merged in a list of results:

(updated) results=merged results

On the contrary, if no hyphen immediately precedes or follows the searched words or if the corpus processing server does not return any result in response to the candidate queries, a test is carried out to determine whether or not the initial selection (i.e. the searched words) is a function word (step 220).

If the initial selection is a function word, an extended selection is searched (step 225).

According to a particular embodiment, words are successively added to the searched word, for example on its right, until a word that does not belong to the function word list has been added, until a character belonging to the segment separators list has been met, or until the number of added words reaches a predetermined number S.

Then the selection is updated so as to correspond to the extended selection (i.e. the searched word and the added word(s)):

(updated) selection=extended selection

According to a particular embodiment, if the searched word belongs to the connector list, it is removed from the extended selection (before updating the selection).

If the initial selection is not a function word or after having extended the selection, a test is carried out to determine whether or not at least the first character of the searched words is in upper-case (step 230).

If at least the first character of the searched words is in upper-case, a list of candidates is created based on the selection and on the selection sets in lower-case (step 235):

candidates={selection, selection in lower-case}

Next, for each of the candidates, the corpus processing server is queried to obtain a translation, a definition, and/or examples directed to the corresponding candidate.

If the corpus processing server returns at least one result in response to the candidate queries (step 240), the obtained results are merged in the list of results:

(updated) results=merged results

On the contrary, if the first character of the searched words is not in upper-case or if the corpus processing server does not return any result in response to the candidate queries, a test is carried out to determine whether or not the selection ends with a suffix from the suffix list such a "'s" (step 245).

If the selection ends with a suffix from the suffix list, a list of candidates is created based on the selection and on the selection wherein the suffix has been removed (step 250):

candidates={selection, selection without suffix}

Then, for each of the candidates, the corpus processing server is queried to obtain a translation, a definition, and/or examples directed to the corresponding candidate.

If the corpus processing server returns at least one result in response to the candidate queries (step 255), the obtained results are merged in the list of results:

(updated) results=merged results

On the contrary, if the selection does not end with a suffix from the suffix list or if the corpus processing server does not return any result in response to the candidate queries, a test is carried out to determine whether or not a character from the punctuation character list immediately follows the selection (step 260).

If a character from the punctuation character list immediately follows the selection, a list of candidates is created based on the selection and on the selection to which the punctuation character immediately following the selection is added (step 265):

candidates={selection, selection with following punctuation character}

Then, for each of the candidates, the corpus processing server is queried to obtain a translation, a definition, and/or examples directed to the corresponding candidate.

If the corpus processing server returns at least one result in response to the candidate queries (step 270), the obtained results are merged in the list of results:

(updated) results=merged results

According to a particular embodiment, the results obtained in response to a query associated with the candidate corresponding to the selection to which the punctuation character has been added is given a higher priority than the results obtained in response to a query associated with the candidate corresponding to the selection.

Still according to a particular embodiment, some or each of the characters from the character punctuation list are added to the selection for creating the candidates.

On the contrary, if a character from the punctuation character list does not immediately follow the selection or if the corpus processing server does not return any result in response to the candidate queries, the corpus processing server is queried to obtain a translation, a definition, and/or examples directed to the selection (step 275).

Then, after having obtained results (step 215, 240, 255, 270, or 280), a test is carried out to determine whether or not the selection begins with an article (step 285). This happens when the selection begins with a word belonging to the article list or when it begins with an elided word from the article list (e.g. the selection contains an apostrophe and when the selection is split on the apostrophe, the left part of the selection is a word from the elided article list).

If the selection begins with an article, the obtained results are reordered so as to set higher priority on the noun and a lower priority to the noun following the article (step 290). More generally, if the selection begins with some tool words such as an article and if the obtained results have different parts of speech, the part of speech corresponding to its position in the sentence may be considered in priority. For example, if a word which can be a noun and a verb is preceded by an article, the translation as noun may be preferred. Likewise, if the sentence contains some words specific to a particular domain, translations corresponding to this domain may be considered in priority.

Next, the results are ordered and displayed as described with reference to step 115 in FIG. 1.

If no result is found (step 280), further searches may be conducted after having replaced the selection with similar words.

According to other embodiments, step 220 may be carried out whether or not results are obtained at step 210. Likewise, steps 245, 260, and 275 may be carried out whether or not results are obtained at steps 240, 255, and 270, respectively.

Figure 3:
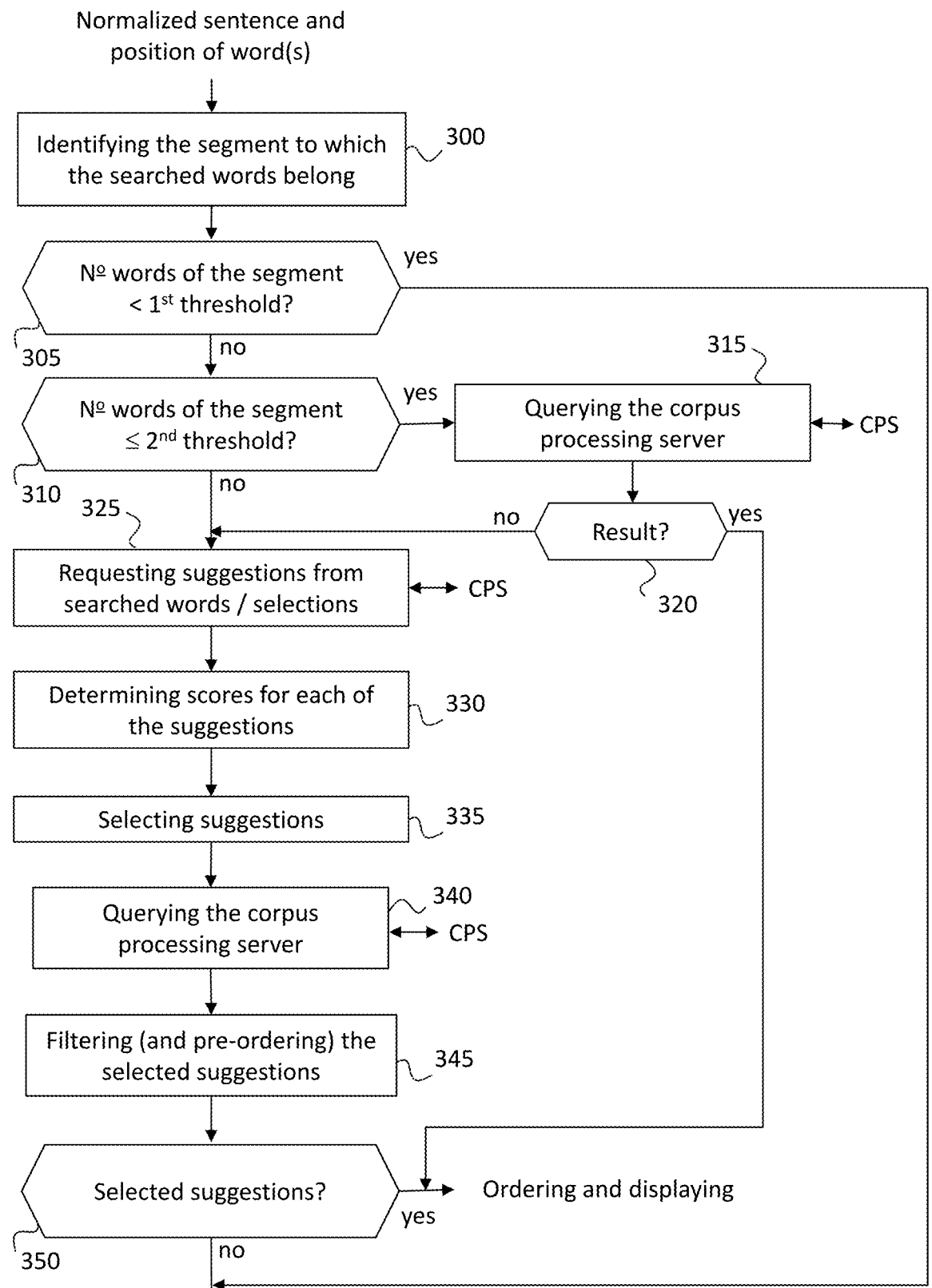
FIG. 3 illustrates steps of an example of an algorithm for obtaining and processing expressions comprising the words to be searched, as illustrated with reference 120 in FIG. 1, that is to say to find and to translate and/or obtain definitions and examples of relevant expressions containing the searched words.

FIG. 3 illustrates steps of an example of an algorithm for obtaining and processing expressions comprising the words to be searched, as illustrated with reference 120 in FIG. 1, that is to say to find and to translate and/or obtain definitions and examples of relevant expressions containing the searched words.

As illustrated, a first step is directed to identifying the segment to which the searched words belong (step 300). Such a segment may be determined as being the longest group of words comprising the searched words that is preceded and followed by a character from the segment separator list.

Next, a test is carried out to determine whether or not the number of words of the identified segment is smaller than or equal to a first predetermined threshold (step 305).

For the sake of example, the value of such a first predetermined threshold may be set to 2.

According to other embodiments, this step of determining whether or not the number of words of the identified segment is smaller than or equal to a first predetermined threshold is skipped (i.e. the algorithm goes to step 310 whether or not the number of words of the identified segment is smaller than or equal to a first predetermined threshold).

If the number of words of the identified segment is smaller than or equal to the first predetermined threshold, another algorithm is preferably used. Such other algorithm may be for example the one described with reference to FIG. 4.

On the contrary, if the number of words of the identified segment is greater than the first predetermined threshold, another test is carried out to determine whether or not the number of words of the identified segment is smaller than or equal to a second predetermined threshold (step 310).

For the sake of example, the value of such a second predetermined threshold may be set to 4.

If the number of words of the identified segment is smaller than or equal to the second predetermined threshold, the corpus processing server (CPS) is queried to obtain a translation, a definition, and/or examples for the identified segment (step 315). The request for querying the corpus processing server typically comprises the identified segment as well as a reference to the source and target languages.

If the corpus processing server returns a result in response to the query (step 320), the obtained result is merged into the list of results:

(updated) results=merged results

On the contrary, if the number of words of the identified segment is greater than the second predetermined threshold or if the corpus processing server does not return any result in response to the query, suggestions are requested (step 325).

These suggestions are requested from a corpus processing server based on the searched words. Such corpus processing server used to obtain suggestions may be the same corpus processing server as the one used to obtain definitions, translations, and/or examples or may be a different corpus processing server.

According to a particular embodiment, the suggestions are requested from a corpus processing server based on the selection as determined from an algorithm such as the one described by reference to FIG. 2. The algorithm ends if no result is received in response to this request. In such a case, an algorithm such as the one illustrated in FIG. 4 may be used.

If at least one suggestion is obtained, one or more scores are then determined for each of the received suggestions (step 330).

According to a particular embodiment, three different scores are associated with each of these suggestions:
a phraseological score denoted $S_i^{phraseological}$ that corresponds to the phraseological index as determined by the corpus processing server;
a match score denoted $S_i^{match}$ that gives an indication as to how well the expression matches the searched words or selection;
a global score denoted $S_i^{global}$ determined as a function of the associated phraseological score and match score, wherein i represents an index of the considered suggestions.

For the sake of illustration, a value of a global score may be determined as being a weighted mean of the corresponding phraseological score and match score.

Next, a minimum match score denoted $S_{min}^{match}$ is obtained or determined. This minimum match score is compared with the match score associated with each suggestion to select those whose match score is equal to or greater than the minimum match score (step 335).

In other words, a suggestion i is selected if $S_i^{match} \geq S_{min}^{match}$.

For each of the selected suggestions, the corpus processing server is queried to obtain a translation, a definition, and/or examples directed to the corresponding expression (step 340).

Again, the request for querying the corpus processing server typically comprises an expression as well as a reference to the source and target languages.

As a result, there is provided a set of selected suggestions and, for each of them, a global score as well as, possibly, translations, definitions, and/or examples.

At this stage, all the selected suggestions are filtered and preferably pre-ordered (step 345).

For the sake of illustration, such a filtering step may comprise a step of deselecting the selected suggestions for which the corpus processing server did not provide any translation, definition, or example. It may also comprise a step of deselecting the less relevant suggestions that are selected so that the number of words of the result associated with the selected suggestions does not exceed a predetermined number.

The pre-ordering step may comprise a step of ordering the result as a function of the global score associated with the corresponding selected suggestions (by descending order) and/or as a function of the obtained translations, definitions, and/or examples.

A test is then carried out to determine whether or not at least one suggestion is selected (step 350).

If at least one suggestion is selected, the results are ordered and displayed as described with reference to step 115 in FIG. 1.

On the contrary, if no suggestion is selected, another algorithm is preferably used. Such other algorithm may be for example the one described with reference to FIG. 4.

Figure 4:
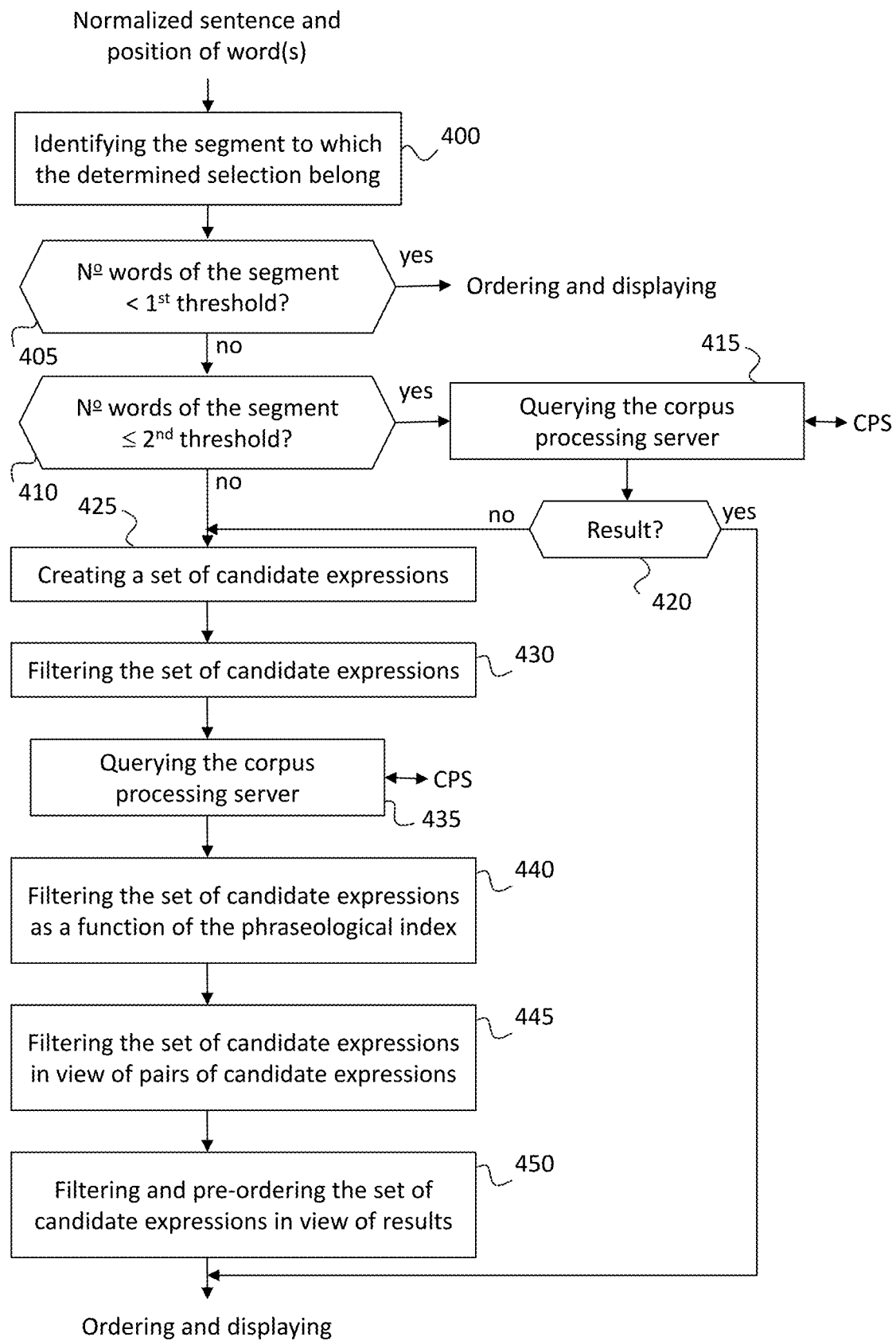
FIG. 4 illustrates steps of an example of an algorithm for obtaining and processing expressions comprising the words to be searched, as illustrated with reference 120 in FIG. 1, in particular when an algorithm such as the one illustrated in FIG. 3 fails to provide a result.

FIG. 4 illustrates steps of an example of an algorithm for obtaining and processing expressions comprising the words to be searched, as illustrated with reference 120 in FIG. 1, in particular when an algorithm such as the one illustrated in FIG. 3 fails to provide a result.

As illustrated, a first step is directed to identifying the segment to which a previously determined selection belongs (step 400). According to a particular embodiment, the previously determined selection corresponds to a selection obtained when executing an algorithm for processing a set of one or more searched words alone such as the one described with reference to FIG. 2.

The identified segment may be the longest group of words comprising the previously determined selection that is preceded and followed by a character from the segment separator list.

Next, a test is carried out to determine whether or not the number of words of the identified segment is smaller than or equal to a first predetermined threshold (step 405).

For the sake of example, the value of such a first predetermined threshold may be set to 2.

According to other embodiments, this step of determining whether or not the number of words of the identified segment is smaller than or equal to a first predetermined threshold is skipped (i.e. the algorithm goes to step 410 whether or not the number of words of the identified segment is smaller than or equal to a first predetermined threshold).

If the number of words of the identified segment is smaller than or equal to the first predetermined threshold, the algorithm ends and only the results obtained by processing a set of one or more searched words alone are ordered and displayed, as described with reference to step 115 in FIG. 1.

On the contrary, if the number of words of the identified segment is greater than the first predetermined threshold, another test is carried out to determine whether or not the number of words of the identified segment is smaller than or equal to a second predetermined threshold (step 410).

For the sake of example, the value of such a second predetermined threshold may be set to 4.

If the number of words of the identified segment is smaller than or equal to the second predetermined threshold, the corpus processing server (CPS) is queried to obtain a translation, a definition, and/or examples for the identified segment (step 415). The request for querying the corpus processing server typically comprises the identified segment as well as a reference to the source and target languages.

If the corpus processing server returns a result in response to the query (step 420), the obtained results are merged in the list of results:

(updated) results=merged results

On the contrary, if the number of words of the identified segment is greater than the second predetermined threshold or if the corpus processing server does not return any result in response to the query, a set of candidate expressions is created (step 425).

Such a set of candidate expressions can be created by obtaining a maximum number of words per group, denoted S, and by forming groups of words (preferably contiguous words), each comprising s words with 1<s<S. Each created group of words should be comprised in the identified segment (i.e. the segment identified at step 400) and should comprise the previously determined selection (e.g. the selection determined when executing the algorithm described with reference to FIG. 2).

Each created group of words is considered as a candidate expression.

Next, the set of candidate expressions is filtered (step 430).

Such a filtering step may comprise a step of removing the candidate expressions that begins and/or ends with a word belonging to the connector list, the candidate expressions that comprise two words and that begin with a word belonging to the article list, and the candidate expressions that ends with a word belonging to the article list if this word is not the last of the identified segment (i.e. the segment identified at step 400).

According to a particular embodiment, the set of candidate expressions is then ordered by descending number of words and then by alphabetical order.

In a following step (step 435), each of the candidate expressions are processed one after another, in the given order, to obtain from the corpus processing server (CPS) a translation, a definition, and/or examples for each of them.

Again, the request for querying the corpus processing server typically comprises the candidate expression to be processed as well as a reference to the source and target languages.

The results that may comprise translations, definitions, examples, and phraseological index are stored for further use.

Then, a minimum phraseological index is obtained and the candidate expressions that have generated results comprising phraseological indexes smaller than the minimum phraseological index are discarded from the set of candidate expressions (step 440).

In a following step (step 445), the candidate expressions are processed to discard a candidate expression if it exists a similar candidate expression, the single difference between these two candidate expressions being the presence of an article at the beginning of one of the two candidate expressions. In other words, if the set of candidate expressions comprises the candidate expression "X" and the candidate expression "article+X", one of these two candidate expressions should be discarded.

According to a particular embodiment, the candidate expression comprising the article is kept if translations exist for this candidate expression.

Next, the candidate expressions are filtered again and preferably pre-ordered in view of the results (step 450). For the sake of illustration, such a filtering step may comprise a step of discarding the candidate expressions for which the corpus processing server did not provide any translation, definition, or example. It may also comprise a step of discarding the less relevant candidate expressions so that the number of words of the result associated with the candidate expressions does not exceed a predetermined number.

The pre-ordering step may comprise a step of ordering the results as a function of the phraseological index associated with the corresponding candidate expression (by descending order) and/or as a function of the obtained translations, definitions, and/or examples.

Accordingly, the algorithm illustrated in FIG. 4 makes it possible to provide a list of filtered and pre-ordered expressions along with associated definitions, translations, and/or examples and with associated phraseological indexes.

For the sake of illustration, several examples of applying the algorithms described with reference to FIGS. 2 to 4 are given.

According to a first example, the obtained sentence is "Everything has to come to an end, sometime." and the word to be searched is "end".

Since the sentence does not need normalization, the selection is directly set to the searched word (i.e., selection="end").

It is noted that the selection does not comprise any hyphen, is not a function word, and does not end with a suffix (steps 205, 220, and 245). It is also noted that the first character is not in upper-case (step 230).

However, a comma character follows the selection (step 260). Therefore, a candidate list comprising "end" and "end," is created and the corpus processing server is queried for each of these two candidates (step 265).

If it is considered that definitions, translations, and/or examples are obtained, the algorithm is branched to step 285 where it is determined that the selection is preceded by the article "an". The results are then reordered (step 290).

Next, it is determined that the segment to which the searched word "end" belongs is "Everything has to come to an end" (step 300) which comprises 7 words.

If it is considered that the first threshold is equal to 2 and that the second threshold is equal to 4, the algorithm is branched to step 325 to obtain relevant expressions.

For the sake of example, it is considered that the relevant expressions comprising the searched word "end" are "end up", "distal end", "one end", "first end", "in the end", "put an end", "come to an end", "end game", and "the end of the game".

It is also considered that all the corresponding match scores are equal to zero except the one associated with the expression "come to an end" which is equal to one.

By using a minimum match score of 0.75, only the expression "come to an end" is selected (step 335). By querying a corpus processing server with a definition, a translation, and examples, it is considered that a translation and examples are available (step 340).

Since a response is available for all the selected expressions, there is no need for filtering.

Moreover, by considering that the expression "come to an end" has the highest phraseological index and global score, it is selected to be displayed first.

According to a second example, the obtained sentence is "If you're going through hell, keep going." and the word to be searched is "keep".

Again, since the sentence does not need normalization, the selection is directly set to the searched word (i.e., selection="keep").

It is noted that the selection does not comprise any hyphen, is not a function word, does not end with a suffix, and is not directly preceded by a punctuation character (there is a space between the comma and the searched word). It is also noted that the first character is not in upper-case.

A definition, a translation, and examples are then requested for the selection. By considering that a translation and examples are available and by noting that the selection is not preceded by an article, there is no need for further processing by the steps described with reference to FIG. 2.

Turning to step 300, it is determined that the segment to which the searched word "keep" belongs is "keep going" which comprises 2 words.

If it is considered again that the first threshold is equal to 2 and the second threshold is equal to 4, the algorithm is branched to step 315.

Accordingly, the expression "keep going" is used to search for definitions, translations, and examples.

By considering that that the phraseological index or global score associated with the expression "keep going" is higher than the phraseological index or global score associated with the search word "keep" (which result has been obtained thanks to the algorithm illustrated in FIG. 2), the result associated with the expression "keep going" is selected to be displayed.

According to a third example, the obtained sentence is "Sophie, please, get us out of this mess!" and the word to be searched is "please".

Again, since the sentence does not need normalization, the selection is directly set to the searched word (i.e., selection="please").

It is noted that the selection does not comprise any hyphen, is not a function word, and does not end with a suffix. It is also noted that the first character is not in upper-case.

However, a comma character follows the selection (step 260). Therefore, a candidate list comprising "please" and "please," is created and the corpus processing server is queried for each of these two candidates (step 265).

If it is considered that definitions, translations, and/or examples are obtained, the algorithm is branched to step 285 where it is determined that the selection is not preceded by an article.

Turning to step 300, it is determined that the segment to which the searched word "please" belongs is "please" which comprises only one word.

If it is considered again that the first threshold is equal to 2 and the second threshold is equal to 4, the algorithm ends and the algorithm illustrated in FIG. 4 is used.

Turning to step 400, it is determined that the segment to which the selection "please" belongs is "please" which comprises only one word.

If it is considered again that the first threshold is equal to 2 and the second threshold is equal to 4, the algorithm ends and the result obtained using the algorithm illustrated in FIG. 2 is displayed.

Figure 5:
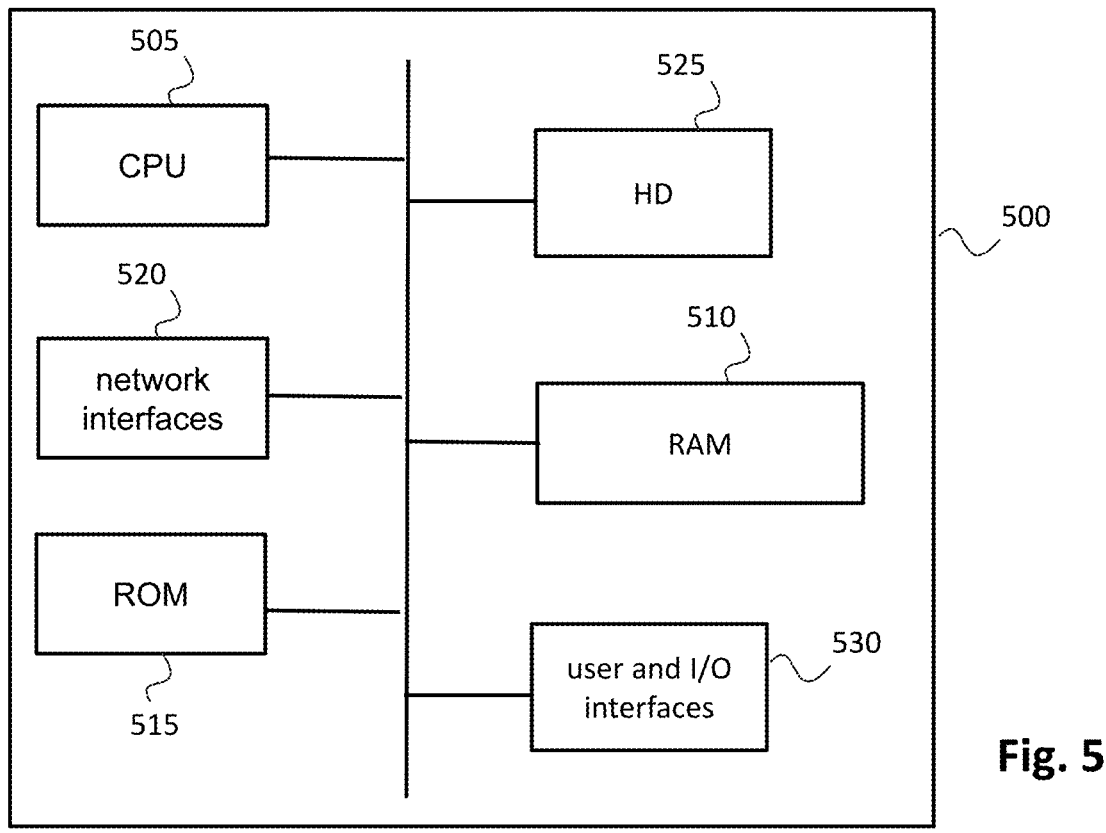
FIG. 5 is a schematic block diagram of a computing device for implementation of one or more embodiments of the invention.

FIG. 5 is a schematic block diagram of a computing device 500 for implementation of one or more embodiments of the invention, in particular at least some of the steps described with reference to FIGS. 2, 3, and 4.

Computing device 500 comprises a communication bus connected to:
- a central processing unit 505, such as a microprocessor, denoted CPU;
- a random access memory 510, denoted RAM, for storing the executable code of the method of embodiments of the invention as well as the registers adapted to record variables and parameters necessary for implementing the method for providing definitions, translations, and/or examples according to embodiments of the invention, the memory capacity of which can be expanded by an optional RAM connected to an expansion port for example;
- a read only memory 515, denoted ROM, for storing computer programs for implementing embodiments of the invention; and
- a network interface 520 typically connected to a communication network over which digital data can be transmitted or received. The network interface 520 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 505.

Optionally, the communication bus of computing device 500 may be connected to:
- a hard disk 525 denoted HD used as a mass storage device; and/or
- a user interface and/or an input/output interface 530 which can be used for receiving inputs from a user, displaying information to a user, and/or receiving/sending data from/to external devices.

The executable code may be stored either in read only memory 515, on hard disk 525 or on a removable digital medium such as for example a disk. According to a variant, the executable code of the programs can be received by means of a communication network, via the network interface 520, in order to be stored in one of the storage means of the communication device 500, such as hard disk 525, before being executed.

Central processing unit 505 is adapted to control and direct the execution of the instructions or portions of software code of the program or programs according to embodiments of the invention, which instructions are stored in one of the aforementioned storage means. After powering on, CPU 505 is capable of executing instructions from main RAM memory 510 relating to a software application after those instructions have been loaded from ROM 515 or from hard-disk 525 for example. Such a software application, when executed by CPU 505, causes the steps of the algorithms herein disclosed to be performed.

Any step of the algorithm herein disclosed may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications which lie within the scope of the present invention will be apparent to a person skilled in the art.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for a computer for providing words linguistically associated with searched words, the method comprising:
    obtaining a searched word for which at least one word linguistically associated with said searched word has to be provided;
    obtaining a set of words to which the searched word belongs, said set of words comprising a plurality of words including the searched word;
    identifying a segment of contiguous words in the set of words, the segment comprising the at least one searched word and having a number of words strictly lower than a number of words of the set of words;
    determining the number of words in the identified segment and comparing the determined number of words with a threshold;
    in the event that the number of words in the identified segment is lower than or equal to the threshold, querying a third database to obtain a sequence of words linguistically associated with the identified segment; and
    in the event that the number of words in the identified segment is determined to be higher than the threshold, querying a first database of expressions to obtain a set of expressions, each expression of the set of expressions comprising the searched word, and obtaining the set of expressions;
    selecting expressions of the obtained set of expressions as a function of a score associated with each expression of the set of expressions and of a score threshold to form a subset of expressions;
    for each expression of the subset of expressions, querying a second database to obtain a word sequence linguistically associated with said expression;
    obtaining, from the obtained word sequences, at least one word linguistically associated with the searched word; and
    selecting at least one obtained word linguistically associated with the searched word.

2. The method of claim 1, wherein the score is based at least partially on a criterion representing a matching level of a considered expression in relation to several contiguous or non-contiguous words of the identified segment comprising the searched word.

3. The method of claim 2, wherein the score is based at least partially on an indication associated with an obtained word linguistically associated with the searched word.

4. The method of claim 2, further comprising:
    ordering the at least one selected obtained word linguistically associated with the searched word.

5. The method of claim 2, further comprising:
    normalizing the set of words according to one or more predetermined criteria.

6. The method of claim 1, wherein the score is based at least partially on an indication associated with an obtained word linguistically associated with the searched word.

7. The method of claim 6, further comprising:
    ordering the at least one selected obtained word linguistically associated with the searched word.

8. The method of claim 1, further comprising:
    ordering the at least one selected obtained word linguistically associated with the searched word.

9. The method of claim 1, further comprising:
    normalizing the set of words according to one or more predetermined criteria.

10. The method of claim 1, further comprising:
    processing the searched word to obtain at least one word linguistically associated with the searched word while considering the searched word alone.

11. The method of claim 1, further comprising:
    generating a set of candidate expressions, each candidate expression comprising the searched word, and, for each of the candidate expressions, querying the second database to obtain at least one word linguistically associated with the searched word and obtaining the at least one word linguistically associated with the searched word.

12. The method of claim 11, further comprising:
    filtering the set of candidate expressions before querying the second database for each of the candidate expressions.

13. The method of claim 11, further comprising:
    filtering the set of candidate expressions after querying the second database for each of the candidate expressions.

14. The method of claim 1, wherein the first database of expressions and the second database of expressions are the same.

15. The method of claim 1, further comprising:
    selecting the searched word from the set of words and a step of displaying at least one selected obtained word linguistically associated with the searched word.

16. A non-transitory computer-readable medium on which is recorded a computer program comprising instructions that, upon being loaded and executed by a programmable apparatus, carries out each step of the method according to claim 1.

17. A device comprising a microprocessor configured to carry out each step of the method according to claim 1.

* * * * *